United States Patent
Wang et al.

(10) Patent No.: US 12,309,195 B2
(45) Date of Patent: May 20, 2025

(54) SECURELY DETECTING ONLINE FRAUD MALWARE

(71) Applicant: Google LLC, Mountain View, CA (US)

(72) Inventors: Gang Wang, Frederick, MD (US); David Bruce Turner, Newark, CA (US)

(73) Assignee: Google LLC, Mountain View, CA (US)

( * ) Notice: Subject to any disclaimer, the term of this patent is extended or adjusted under 35 U.S.C. 154(b) by 202 days.

(21) Appl. No.: 17/925,521

(22) PCT Filed: Sep. 30, 2020

(86) PCT No.: PCT/US2020/053540
§ 371 (c)(1),
(2) Date: Nov. 15, 2022

(87) PCT Pub. No.: WO2022/071941
PCT Pub. Date: Apr. 7, 2022

(65) Prior Publication Data
US 2023/0199021 A1    Jun. 22, 2023

(51) Int. Cl.
*H04L 9/40*   (2022.01)
*H04L 9/32*   (2006.01)

(52) U.S. Cl.
CPC .......... *H04L 63/145* (2013.01); *H04L 9/3213* (2013.01); *H04L 63/04* (2013.01); *H04L 2209/46* (2013.01)

(58) Field of Classification Search
CPC . H04L 9/3213; H04L 2209/46; H04L 63/145; G06Q 30/0185
See application file for complete search history.

(56) References Cited

U.S. PATENT DOCUMENTS 7,870,608 B2    1/2011  Shraim et al.
2009/0125719 A1*  5/2009  Cochran ................ G06Q 30/02
                                                         713/171
(Continued)

FOREIGN PATENT DOCUMENTS

CN    103634317    3/2014
CN    104766014    7/2015
(Continued)

OTHER PUBLICATIONS

Office Action in Indian Appln. No. 202227047723, mailed on Aug. 24, 2023, 7 pages (with English translation).
(Continued)

*Primary Examiner* — Ellen Tran
(74) *Attorney, Agent, or Firm* — Fish & Richardson P.C.

(57) ABSTRACT

A method for secure detection of online fraud. The method includes generating an encrypted profile representing browser activity, sending the encrypted profile to a secure multiparty computation system, receiving a trust token from the secure multiparty computation system, based on a determination that the web browser is not engaged in online fraud, sending a request to redeem the trust token with the secure multiparty computation system, receiving an encrypted record of redemption from the secure multiparty computation system based on a determination that a web site associated with the web content is not blocked, and sending a request, containing the encrypted record of redemption, for third-party content, wherein the third-party content is associated with the web content.

20 Claims, 4 Drawing Sheets

(56) References Cited

U.S. PATENT DOCUMENTS

2015/0039513 A1    2/2015    Adjaoute
2020/0043041 A1*   2/2020    Shaw ................. G06Q 30/0248

FOREIGN PATENT DOCUMENTS

| | | |
|---|---|---|
| CN | 107426181 | 12/2017 |
| JP | 2009-223375 | 10/2009 |
| JP | 2011-065524 | 3/2011 |
| KR | 10-2014-0055093 | 5/2014 |
| KR | 10-1391392 | 5/2014 |
| WO | WO 2009/018566 | 2/2009 |

OTHER PUBLICATIONS

Github.com [online], "Attribution-Reporting-Api" May 2019, retrieved on Jan. 25, 2023, retrieved from URL <https://github.com/WICG/attribution-reporting-api/>, 4 pages.

Github.com [online], "IP-Blindness" Nov. 2019, retrieved on Jan. 25, 2023, retrieved from URL <https://github.com/spanicker/ip-blindness>, 5 pages.

Github.com [online], "Privacy-Budget" Aug. 2019, retrieved on Jan. 25, 2023, retrieved from URL <https://github.com/mikewest/privacy-budget>, 4 pages.

Github.com [online], "Trust-Token-Api" Aug. 2019, retrieved on Jan. 25, 2023, retrieved from URL <https://github.com/WICG/trust-token-api>, 13 pages.

International Search Report and Written Opinion in International Appln. No. PCT/US2020/053540, mailed on May 4, 2021, 13 pages.

Wikipedia.org [online], "Bipartite Graph" Jun. 2003, retrieved on Jan. 25, 2023, retrieved from URL <https://en.wikipedia.org/wiki/Bipartite_graph>, 9 pages.

Wikipedia.org [online], "Cosine similarity" Jan. 2007, retrieved on Jan. 25, 2023, retrieved from URL <https://en.wikipedia.org/wiki/Cosine_similarity>, 7 pages.

Wikipedia.org [online], "Exponential Decay" Sep. 2003, retrieved on Jan. 25, 2023, retrieved from URL <https://en.wikipedia.org/wiki/Exponential_decay>, 7 pages.

Wikipedia.org [online], "Hamming Distance" Feb. 2002, retrieved on Jan. 25, 2023, retrieved from URL <https://en.wikipedia.org/wiki/Hamming_distance>, 6 pages.

Wikipedia.org [online], "Locality-sensitive hashing" Jun. 2007, retrieved on Jan. 25, 2023, retrieved from URL <https://en.wikipedia.org/wiki/Locality-sensitive_hashing#Random_projection>, 10 pages.

Wikipedia.org [online], "One-Hot" Jun. 2005, retrieved on Jan. 25, 2023, retrieved from URL <https://en.wikipedia.org/wiki/One-hot>, 4 pages.

Wikipedia.org [online], "Sparse matrix" Oct. 2003, retrieved on Jan. 25, 2023, retrieved from URL <https://en.wikipedia.org/wiki/Sparse_matrix>, 9 pages.

Wikipedia.org [online], "User Agent" Feb. 2004, retrieved on Jan. 25, 2023, retrieved from URL <https://en.wikipedia.org/wiki/User_agent>, 5 pages.

Office Action in Korean Appln. No. 10-2022-7032013, mailed on Mar. 21, 2024, 13 pages (with English translation).

Notice of Allowance in Japanese Appln. No. 2022-556210, mailed on Nov. 27, 2023, 5 pages (with English translation).

International Preliminary Report on Patentability in International Appln. No. PCT/US2020/053540, mailed on Apr. 13, 2023, 8 pages.

Notice of Allowance in Korean Appln. No. 10-2022-7032013, mailed on Nov. 21, 2024, 4 pages (with English translation).

Office Action in Chinese Appln. No. 202080098770.8, mailed on Nov. 11, 2024, 31 pages (with English translation).

Office Action in Chinese Appln. No. 202080098770.8, mailed on Mar. 18, 2025, 31 pages (with English machine translation).

\* cited by examiner

| | 1 | 2 | ... | k | ... | m | ... | n | ... |
|---|---|---|---|---|---|---|---|---|---|
| 1 | 0 | 0 | ... | 0 | ... | 0 | ... | 0 | ... |
| 2 | 0 | 0 | ... | 0 | ... | 0 | ... | 0 | ... |
| ... | ... | ... | ... | ... | ... | ... | ... | ... | ... |
| p | 0 | 0 | ... | 112 | ... | 89 | ... | 137 | ... |
| ... | ... | ... | ... | ... | ... | ... | ... | ... | ... |
| q | 0 | 0 | ... | 78 | ... | 105 | ... | 69 | ... |
| ... | ... | ... | ... | ... | ... | ... | ... | ... | ... |

Browsers (or IP address, or IP address cross UA String) — 310

Location (URL, domain, or publishers) — 320

SECURELY DETECTING ONLINE FRAUD MALWARE

CROSS-REFERENCE TO RELATED APPLICATION

This application is a National Stage Application under 35 U.S.C. § 371 of International Application No. PCT/US2020/053540, filed on Sep. 30, 2020. The disclosure of the prior application is considered part of and is incorporated by reference in the disclosure of this application.

BACKGROUND

This document relates to a method for securely detecting online fraud malware. In some typical online fraud scenarios, malicious publishers and/or their partners manipulate many browsers infected with malware (or pay-to-click) to click on the malicious publishers' webpages for illegitimate financial gain. This kind of online fraud is commonly referred to as publisher inflation. Once browser vendors deprecate third-party cookies, there is presently no effective way to collect a browser's browsing or click history across multiple websites while maintaining data security. Thus, there exists a need for anti-fraud vendors to identify a set of browsers or web views that engage in publisher inflation due to being infected with malware without using third-party cookies all while maintaining the security of client data.

For instance, a user can browse web content of multiple publishers across multiple web sites and domains. The user is provided content based on a number of factors, e.g., browsing history, web content currently viewed, publisher, and the like. Clients affected by online fraud malware tend to request web content of the same suspicious web content publishers repeatedly, and repeatedly engage in the same actions with respect to the web content of those suspicious web publishers. This can result in payments to these suspicious web publishers for online content related to fraudulent access of their web content.

An IP address is one of the most important fingerprinting signals to track clients across websites. However, client security concerns result from use of IP addresses. For instance, the Willful IP Blindness explainer stipulated that any usage of an IP address, with a few exemptions including anti-abuse/anti-fraud, will be counted against a Privacy Budget. IP addresses, by their nature, provide a unique identifier for a client such that they can be found and routed to over the open internet. Since an IP address is a passive source of information, the Privacy Budget explainer describes that it must be considered a consumed source of identifying information for all sites and automatically deducted from the budget. In the face of growing concerns about client data security, this feature of the protocol has turned into a bug in that if an IP address is stable over a period of time (which it often is), it can be used to identify clients across first party websites.

Moreover, using IP addresses to track users across multiple sites for any purposes may not be allowed due to user data security concerns. This is particularly problematic for APIs that may be large sources of information in themselves as use of IP addresses by such a system would exceed any reasonable client data security budget. For websites that need more API access in the face of the Privacy Budget than what remains after IP address access is deducted, these websites need a way to opt out of being exposed to security-sensitive, client-identifying IP addresses.

SUMMARY

In general, one innovative aspect of the subject matter described in this specification may be embodied in a method for securely detecting online fraud malware. A mechanism is provided for HTTP applications to blind themselves to IP addresses and other client-identifying network information such as connection pooling behavior and advertise that fact to clients such that they can change their behavior accordingly. Another innovative aspect of the invention provides for a signed attestation that communicates the fact that a server masks IP addresses and other identifying network information from the application layer of the services that it hosts. A content delivery network (CDN) could offer this as a feature to the services it hosts such that the hosted service can access more APIs than would otherwise be available because their Privacy Budget hasn't been exhausted on the IP address. Similarly, reverse proxies could provide the same service without the burden of hosting the services.

The present invention provides a method for anti-abuse, anti-spam vendors to identify a set of IP addresses, or the combination of IP address and user agent that always acts on a small set of webpages, domains or publishers while protecting client data security. In this context, a user agent may be software that is acting on behalf of a user, such as a web browser that retrieves, renders and facilitates end user interaction with web content. This approach allows anti-abuse, anti-spam vendors to generalize browsers in order to maintain client data security and other sensitive information such as IP addresses.

The present invention also provides a method for anti-abuse, anti-spam vendors to identify a set of IP addresses, or the combination of IP address and user agent, that always visit or convert on a small set of webpages, domains or publishers while promoting client data security. This approach generalizes activity of click type to other activity types, e.g. page view or conversion.

The present invention further provides a method for anti-abuse, anti-spam vendors to identify a set of IP addresses, or the combination of IP address and user agent, that always have suspicious activities on a set of URLs while protecting client data security. This approach generalizes the location where suspicious activities occur, e.g., from an individual URL, to a website, to groups of related websites, such as those owned by the same entity. Beneficially, the methods disclosed herein allow the identification of online fraud without requiring third party cookies, and while maintaining data security.

The method relies on a generic audience machine learning (ML) infrastructure. According to the method, a browser, instructed by fraud detection vendors, creates user profiles based on the browser's activity (e.g., page view, click, or conversion) over web pages, domains or multiple domains owned by the same publisher. After the browser sends the encrypted user profile to the secure multiparty computation (MPC) cluster, the MPC cluster may optionally aggregate the user profile based on browsers' IP addresses and/or browser user agent strings.

The method includes an MPC cluster creating two models, two k-NN or k-means models or the like. In one model, each neighbor is a browser, or browsers aggregated over IP addresses and/or user agent string. This model finds all browsers, or browsers aggregated over IP addresses and/or user agent string that have similar online activities, e.g. page view, click, or conversion, on the same set of locations. Locations may be web pages, domains, or multiple domains owned by the same publisher. In the second model, each neighbor is a location. This model finds all locations where a similar set of browsers (or browsers aggregated over IP addresses and/or user agent string) have similar activities.

Together the two models enable fraud detection vendors to identify fraudulent entities, e.g., browsers, or browsers behind the same IP address and/or browser user agents. The fraud detection vendors can then create block lists for these fraudulent entities. Based on the block lists, the MPC cluster can become a trust token issuer that issues trust tokens to entities not on the block list.

These and other embodiments may each optionally include one or more of these features.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. In certain environments, there had previously been no way to maintain client data security while detecting online fraud in the absence of third party cookies. That shortcoming is addressed by the techniques, devices, and systems discussed herein. The techniques described in this document enable a system to detect and overcome online fraud, among other use cases.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 depicts a representation of browser activity history across locations.

Like reference numbers and designations in the various drawings indicate like elements.

DETAILED DESCRIPTION

Figure 1:
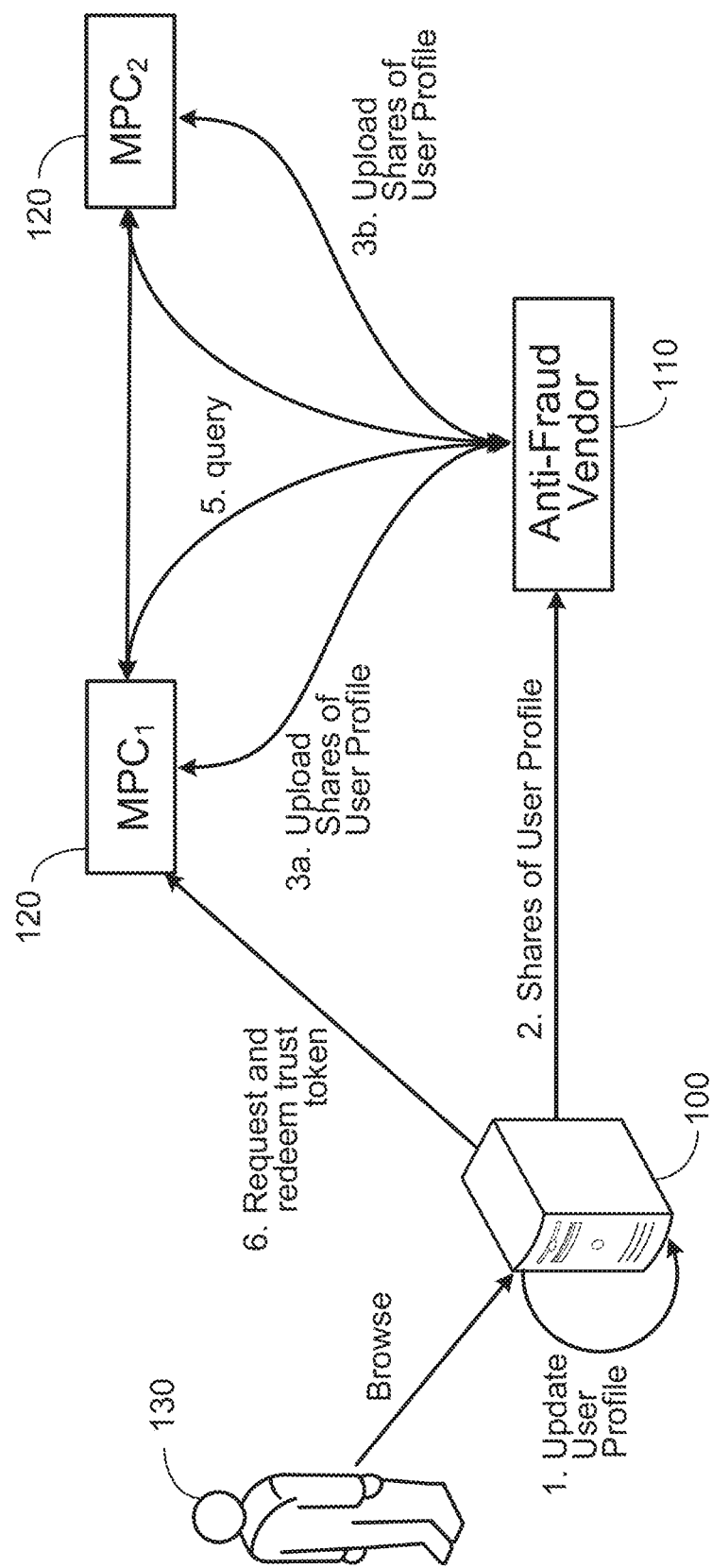
FIG. 1 is a block diagram and flow chart of an example environment for online fraud detection while preserving client data security.

This document describes methods, systems, and devices that allow secure detection of online fraud malware.

In some implementations, the method utilizes a system that allows for detection of online fraud malware while maintaining client privacy and obfuscation of client IP address. According to this method, anti-abuse anti-spam vendors identify a set of IP addresses, or the combination of IP address and user agent, that always click a small set of domains while maintaining client data security by generalizing browsers to other privacy sensitive information such as IP address. Also according to this method, anti-abuse, anti-spam vendors identify a set of IP addresses, or the combination of IP address and user agent, that always visit or convert on a small set of domains while maintaining client data security by generalizing client activity across web content visits. Further according to this method, anti-abuse, anti-spam vendors identify a set of IP addresses, or the combination of IP address and user agent, that always have suspicious activities on a set of URLs while maintaining client data security by generalizing the location where suspicious activities occur.

In one implementation, the method involves browsers maintaining a user profile for the clients. The browsers may include in the user profile requests for web content, actions taken with relation to web content, locations of the web content, IP address, browser identity and version information, user agent string, and the like. Browsers securely share the user profile with an anti-fraud vendor system while maintaining user data security. Browsers may be configured to send user profile information at a specified frequency (e.g., daily). The anti-fraud vendor system receives user profile information. The anti-fraud vendor system may periodically send portions of user profile information to MPC servers. In some implementations, browsers send the user profile securely to MPC servers directly, as instructed by anti-fraud vendor systems. The MPC servers engage in a multi-step secure computation to build a model based on similarities between user profiles. The model assists the anti-fraud vendor system in identifying clusters of IP addresses with similar browsing behaviors. The MPC servers send user profile aggregation results to the Anti-Fraud Vendor. The Anti-Fraud Vendor utilizes the user profile aggregation results when conducting anti-spam or anti-abuse analysis. Based on the anti-spam or anti-abuse analysis, the Anti-Fraud Vendor may create one or more blocklists. A blocklist may contain a list of websites or publishers of websites determined to be engaged in online fraud. A blocklist may also contain clients, IP addresses, or combinations of IP address and user agent determined to be engaged in online fraud. Based on the determination of fraud, the MPC server, based on the blocklist from the Anti-Fraud Vendor system, may issue a trust token to a client, group of clients, or all clients with the same IP address, group of IP addresses, or combination of IP address and user agent indicating whether the client has been determined to be engaged in online fraud. A browser may redeem the trust token with the MPC server when visiting a publisher's site. In the Signed Redemption Record (SRR) issued to the browser at the end of the redemption process, the MPC server, based on the blocklist from the Anti-Fraud Vendor system, may carry additional signals indicating whether the browser is fraudulent, or whether the publisher site is fraudulent. The browser may include the SRR in requests to digital component providers, such as advertising technology providers, in association with a request for web content. In some implementations, based on the blocklist from the Anti-Fraud Vendor system, the MPC servers may refuse to issue trust tokens to browsers who are on the blocklist, or may refuse to redeem trust tokens when the browser is on publisher's websites on the blocklist.

In one implementation, the set of anti-fraud use cases to be detected and prevented according to the present invention can be visualized as a visitation graph, i.e., a bi-partite graph, whose vertices can be divided into two disjoint and independent sets U and V such that every edge connects a vertex U to one in V. In such a visitation graph, each vertex in U represents a cookie, a browser, an IP address, a combination of IP address and user agent, or some other set of client information related to a user. In such a visitation graph, each vertex in V represents a location such as a uniform resource locator (URL), a domain, or a set of domains affiliated with the same publisher. In such a visitation graph, each edge between a vertex in U and a vertex in V represents that the specific user (e.g., a cookie, a browser, an IP address, a combination of IP address and user agent, or some other set of client information related to a user) has engaged in an activity (e.g., visit, click, convert) at the specific location. Online fraud can be detected by finding U'⊂U and V'⊂V such that a significant fraction of outgoing edges from U' go to V' and/or a significant fraction of incoming edges to V' are from U'. A significant fraction may be 70% or more, however heuristic tuning or ML may reveal other significant fractions that are greater than or less than 70%. Such proper subset relationships indicate clients and locations likely engaged in online fraud. Various other methods may be used to determine whether a client, group of clients, IP address, group of IP addresses, or combination of IP address and user agent has or is engaged in online fraud, and the above method is one example.

In one implementation, the method leverages a generic ML architecture. This generic ML architecture may include two or more secure multiparty computation servers or clusters of MPC servers. The generic MPC servers may be affiliated with one or more third party entities. Generic MPC servers affiliated with multiple third parties have the added benefit of obfuscation of client IP data, browser activity, and location data among multiple, independent servers, reducing or disincentivizing the risk of breach of client data security. MPC is a cryptographic mechanism that allows multiple parties to compute jointly on inputs while revealing only a constrained well-defined output with the crypto guarantee that, as long as at least threshold number of parties remain honest, there is no data leak. For example, MPC distributes trust across several helper servers in order to satisfy a high-level goal that auxiliary server side infrastructure should be minimally trusted while enabling computation of the aggregated private outputs. An MPC protocol provides advantages in maintaining data security. For instance, in a secure 2-party computation setup, helper servers cannot see data in the clear, unless both helper servers collude, and if one helper server colludes with a 3rd party, data security is still maintained.

In one optional implementation, a trust token issuer that issues trust tokens based on device or application level signal enables the recipient domain to verify that an HTTP request originates from an official build of a browser running on top of a trustworthy device. In such an implementation, an operating system may be involved with definition or processing of the trust tokens.

FIG. 1 is a block diagram and flow chart of an example environment for online fraud detection while preserving client data security. The environment comprises a browser 100, an anti-fraud vendor 110, and MPCs 120. A device 100 requests and displays web content based on user 130 requests. The user 130 may be a human user or a software entity such as an application, process, thread, program, or the like.

The device 100 updates a user profile per requests of the anti-fraud vendor 110. The frequency of the update may occur per a formula, which applies exponential decay to reduce the storage of user profile data to a constant:

$$\sum_{i=1}^{n} e^{-(record\_age\_in\_seconds_i / decay\_rate\_in\_seconds)} \times FV_i$$

For each monitored event (e.g., ad request, impression, click, conversion, web content request), the anti-fraud vendor 110 provides a feature vector $FV_i$ to the device 100 via a JavaScript API. The event age is record_age_in_seconds$_i$. The decay rate, decay_rate_in_seconds, controls how quickly older events lose weight and have less influence over the user profile calculated. Alternatively, the device 100 may calculate a user profile that requires device 100 storage linear to the number of $FV_i$.

Figure 2:
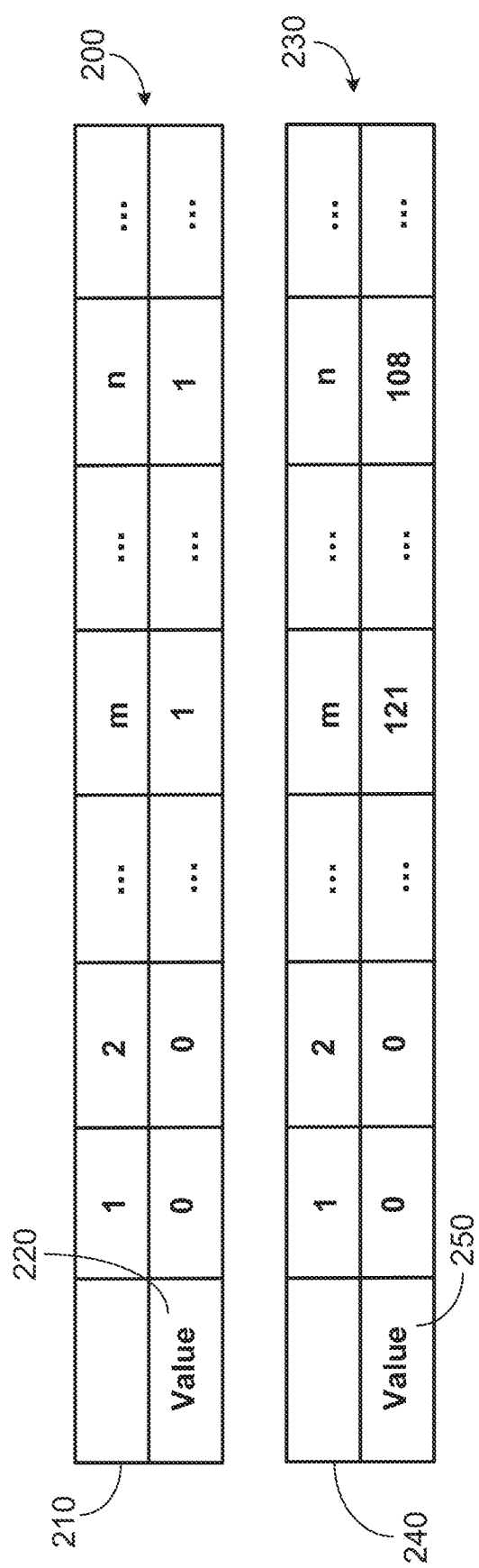
FIG. 2 depicts a representation of browser activity history.

There are multiple methods for the anti-fraud vendor system to define feature vectors $FV_i$. One method is one-hot encoding. As shown in FIG. 2, a one-hot encoding is a feature vector 200 of a group of bits among which the allowed combinations of values 220 are only those with a single high (1) bit and all the others low (0). In the case where there are a total of m ad-supported locations 210 (e.g., URLs, websites, domains, or publishers) prone to online fraud, the feature vector FV would be an m dimensional sparse vector. Each element in the sparse vector corresponds to one location 210. For example, all elements in the sparse vector would be 0, except that the element corresponding to a website that the browser just accessed would be 1. Alternatively, a feature vector 230 may have an element value 250 representing the number of clicks on a location 240 during the study period. There are many popular methods to represent sparse vectors that require minimum storage space. For example, substantial memory requirement reductions can be realized by storing only the non-zero entries of a sparse vector. Depending on the number and distribution of the non-zero entries, different data structures can be used and yield significant savings in memory when compared to the basic approach. The trade-off for efficient storage is that accessing the individual elements becomes more complex and additional structures are needed to be able to recover the original vector unambiguously. Storage formats that support efficient modification, such as DOK (Dictionary of keys), LIL (List of lists), or COO (Coordinate list), are typically used to construct the matrices. Other storage formats include CSR (Compressed Sparse Row) or CSC (Compressed Sparse Column).

In one implementation, the user profile may be calculated according to a feature vector. As described above with respect to feature vector definition, the user profile $P_i$ calculated would be an m dimensional sparse vector, where all elements in the vector would be 0, except that the elements corresponding to the websites that the browser has accessed would be greater than 0. To detect a set of browsers who commit online fraud, it is sufficient for browsers to calculate user profiles locally according to the above formula. The MPC cluster 120 can identify browsers with similar behavior based on cosine similarities between a pair of use profiles $P_i$ and $P_j$.

In one implementation, the browser 100 may cryptographically split user profile $P_i$ into $[P_{i,1}]$ and $[P_{i,2}]$. The crypto design guarantees that each share by itself appears to be pseudo random number that bears no resemblance to the secret user profile $P_i$. In order to reconstruct $P_i$, an entity must possess both $[P_{i,1}]$ and $[P_{i,2}]$ in cleartext. The browser 100 then sends PublicKeyEncrypt ($[P_{i,1}]$, $MPC_1$) and PublicKeyEncrypt ($[P_{i,2}]$, $MPC_2$) to the anti-fraud vendor 110. In one implementation, the anti-fraud vendor 110 batch uploads all PublicKeyEncrypt ($[P_{i,1}]$, $MPC_1$) received in a definable period to $MPC_1$ 120, and all PublicKeyEncrypt ($[P_{i,2}]$, $MPC_2$) received in the same period to $MPC_2$.

In one implementation, $MPC_1$ and $MPC_2$ engage in a multi-step secure computation to build a k-NN model based on cosine similarity between user profile $P_i$ and $P_j$. A probabilistic algorithm based on random projection and hamming distance calculates cosine similarity in ciphertext to maintain user data security under honest-but-curious security model. Cosine similarity measures of similarity between two non-zero vectors of an inner product space. It is defined to equal the cosine of the angle between them, which is also the same as the inner product of the same vectors normalized to both have length 1. Random projection is designed to approximate the cosine distance between two vectors. For instance, a random hyperplane (defined by a normal unit vector r) at the outset is chosen and used to hash the two input vectors to arrive at a cosine distance. The cosine distance between the two vectors indicates similarity. For instance, if the angle between two vectors is 0°, the two vectors are similar or identical. If the angle is 90°, there is no similarity between the two vectors. And if the angle is 180°, the two vectors are opposites of each other. The hamming distance between two vectors of equal length is the number of positions at which the corresponding symbols are different, also indicating similarity or dissimilarity between the two vectors. An honest-but-curious (HBC) adversary is a legitimate participant in a communication protocol who will not deviate from the defined protocol but will attempt to learn all possible information from legitimately received messages. Encoding the user profiles and operating on the encoded shares of user profiles maintains user data security in accord with the objectives of the present invention.

In one implementation, detecting a set of IP addresses (or the cross between IP address and user agent) with similar suspicious behavior, user profiles calculated by the above formula may not be sufficient. Instead, the MPC cluster may aggregate user profiles reported by individual browsers across IP addresses (or the cross between IP address and user agent). Aggregation may occur as follows, using $MPC_1$ as an example. $MPC_1$ receives an encrypted report with the following information: browser IP address, browser user agent string (optional), secret share of user profile $[P_{i,1}]$, timestamp of the user profile $t_i$. $MPC_1$ computes the aggregation key for secret shares of user profiles as HMAC (browser_ip_address||optional_user_agent_string, secret_key_for_model_version). For all secret shares of user profiles that share the same aggregation key, $MPC_1$ calculates the sum of all profiles associated with the IP address (or the cross between IP address and user agent). The combined profile for an IP address (or the cross between IP address and user agent) enables building a k-NN model that identifies clusters of IP addresses with similar behavior. For clarity, "user profile" in this document refers to any of user profile for one browser, combined profiles for an IP address, combined profiles of a cross between IP address and user agent.

In one implementation, the MPC cluster builds multiple models to detect fraudulent browser activity and fraudulent locations using the same training dataset. For instance, an MPC cluster may try to identify clusters of browsers that commit online fraud on a small number of websites. To do this, the MPC cluster may build two models with one model identifying browsers with similar behavior and another model identifying websites interacted with by a set of similar browsers. To determine browsers with similar behavior, an MPC server may receive a list of user profiles from the anti-fraud vendor. Each user profile is a sparse vector of m dimension, corresponding to m websites. Each user profile is represented as a row vector with a user profile list size of n. By calculating the cosine distance between a pair of user profiles and building the k-NN model accordingly, $MPC_1$ and $MPC_2$ can identify clusters of browsers with similar behavior. With reference to FIG. 3, to identify websites interacted with by a set of similar browsers, $MPC_1$ can stack up the n user profiles 320 into a n×m matrix 300. In such a matrix 300, each column vector 310 encodes all browsers' behavior on the corresponding website. By calculating the cosine distance between a pair of column vectors 310 and building the k-NN model accordingly, $MPC_1$ and $MPC_2$ can identify clusters of websites with similar user interaction, e.g., websites receiving the majority of clicks from the same set of browsers.

In one implementation, the MPC cluster returns aggregation results (e.g., the two k-NN models) to the anti-fraud system. The anti-fraud system uses these aggregation results to identify clusters of browsers that commit online fraud on a small number of websites. The anti-fraud system applies queries to the two k-NN models. These queries identify: a small number of websites (e.g., columns in the n×m sparse matrix) that have high cosine similarity (as discussed in this document) among themselves: a small number of browsers, or IP addresses, or IP address cross user agent strings (e.g., rows in the n×m matrix) that have high cosine similarity among those clusters; and a small number of clusters of browsers that contributed most of the clicks or interactions received by the small number of websites identified in response to the first query. In matrix representation, within the n×m sparse matrix, most non-zero elements in the columns corresponding to this small number of websites are concentrated on the rows corresponding to the browsers.

In one implementation, heuristics may be applied to the query results in order to determine browsers and locations that are engaged in online fraud. Based on actual results, these heuristics may be tuned to reduce false positives while eliminating most online fraud. For example, if 90% of pageviews of a website is from 1,000 browsers, and 80% of pageviews of those browsers are on the website, the 1,000 browsers and the websites are suspicious of online fraud.

In one implementation, once the heuristics have revealed results of the aggregation and analysis, measures to prevent online fraud may be undertaken. For instance, browsers and locations determined by an Anti-Fraud Vendor system to be engaged in online fraud may be placed on a blocklists. Browsers, IP addresses, or IP addresses cross user agent strings, that are determined to be engaged in online fraud will be added to a browser blocklist. Locations that are determined to be engaged in online fraud will be added to a location blocklist. Browsers on the browser blocklist are not shown digital components, such as revenue generating content (e.g., advertisements). Locations on the location blocklist are not provided with digital components, again such as revenue generating content, from vendors and so no digital components, such as revenue generating content, is shown at blocklisted locations. Beneficially, in the context of the digital components being revenue generating content, no revenue generating content is shown at blocklisted locations. In the context of the digital components more generally, the prevention of such components being displayed at blocklisted locations reduces network traffic and processing loads as such components need not be transmitted or rendered, and reduces potential for exposure to malware. Absent the claimed method, conventional systems may transmit all digital components without prior filtering via a blocklist of fraudulent entities, significantly increasing network bandwidth and processing requirements, and increasing exposure to malware.

In one implementation, after query and heuristic analysis, the anti-fraud vendor may craft the list of locations (e.g., URLs, websites, or publishers) corresponding to a subset of columns in the n×m sparse matrix that are engaged in online fraud. Providers of digital components can therefore block those locations from receiving digital components. For example, advertising technology companies can block those locations from serving advertisements. Because the identity of these locations determined to be engaged in online fraud is typically not data security or privacy sensitive, digital component providers, such as advertising technology companies, may receive the list of those locations in cleartext directly from the anti-fraud vendor or the MPC cluster and build block lists accordingly.

For data security and privacy reasons, it may be undesirable to share lists of browsers, IP addresses, or crosses of IP address and user agent in cleartext. In one implementation, a trust token implementation may be desirable to address data security and privacy concerns.

Figure 4:
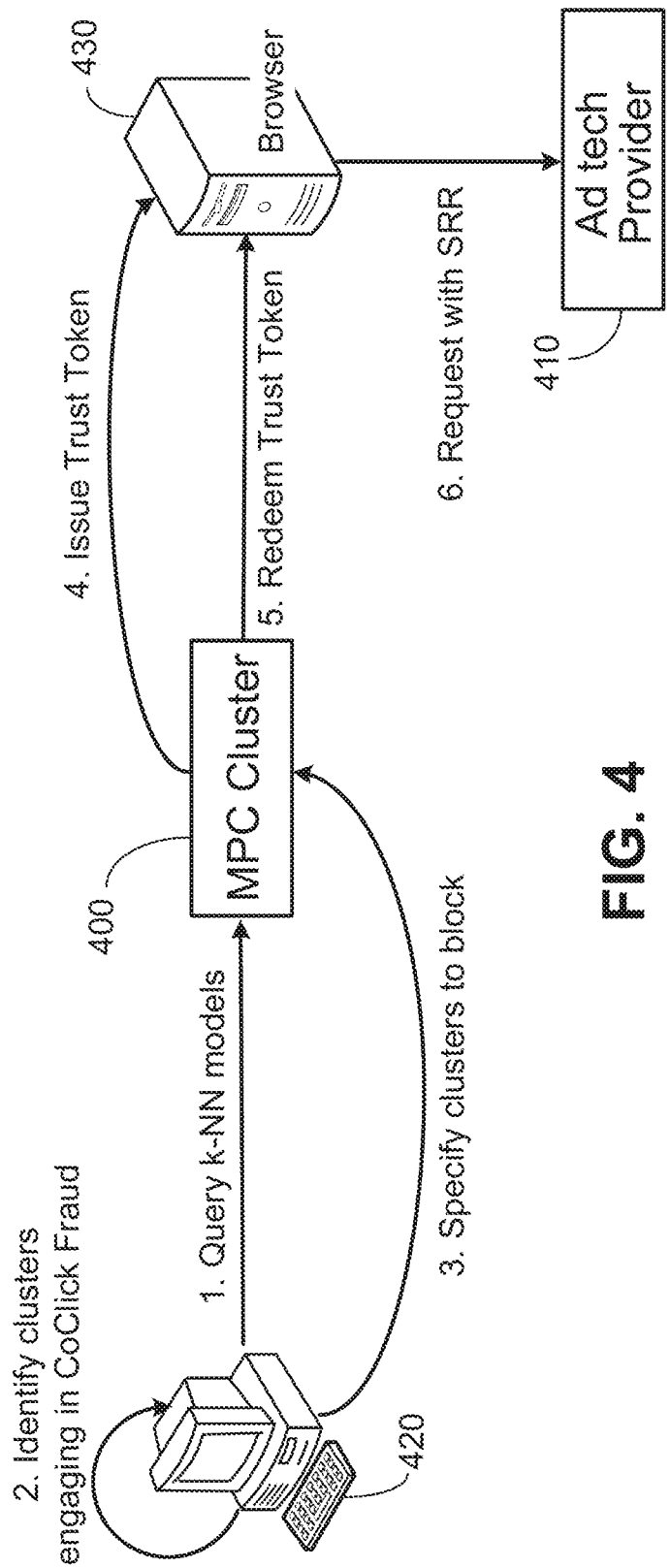
FIG. 4 is a block diagram and flow chart of an example process for detecting and mitigating online fraud malware.

In one implementation, a trust token API notifies digital component providers, such as advertising technology providers, whether a browser, browsers associated with specific IP addresses, or browsers associated with specific IP addresses and user agent strings have been determined to be engaged in online fraud. FIG. 4 provides a block diagram and flow chart for utilizing a trust token mechanism. The anti-fraud system 420 queries the 2 k-NN models created and owned by the MPC cluster 400. The anti-fraud system 420 analyzes the aggregated report received from the MPC cluster 400 to identify the clusters of browsers that are likely engaged in the online fraud. The anti-fraud system 420 uploads to the MPC cluster 400 the clusters of browsers to block. Each cluster can be identified by a maximum hamming distance to the cluster center represented by the bit vector. The MPC cluster 400 calculates the hamming distance between the bit vector of a user profile uploaded by a browser and the center of any cluster to be blocked. If any hamming distances are smaller than the corresponding hamming distance threshold, the browser is likely engaged in online fraud and should be blocked. The MPC cluster 400 can issue a trust token to a browser 430 accordingly, for example, encoding whether the browser 430 is likely engaged in online fraud in a hidden bit. Later when the browser visits a publisher's site, the browser 430 redeems the trust token and makes a signed redemption record (SRR) (otherwise termed a record of redemption) available in requests to a digital component provider 410, such as an advertising technology provider. Because the trust token relies on a purposefully designed issuance and redemption process with cryptographic technology, advertising technology companies cannot use the trust token to track individuals, browsers, IP addresses and the like, ensuring data security and privacy.

An electronic document (which, for brevity, will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices: magnetic disks, e.g., internal hard disks or removable disks: magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for detecting online fraud malware comprising:
   generating an encrypted profile representing web browser activity;
   sending the encrypted profile to a secure multiparty computation system, wherein:
      a first share of the encrypted profile is sent to a first server of the secure multiparty computation system;
      a second share of the encrypted profile is sent to a second server of the secure multiparty computation system; and
      both of the first share and the second share are required to reconstruct the encrypted profile;
   receiving a trust token from the secure multiparty computation system, the trust token being indicative of whether the web browser is engaged in online fraud;
   in preparation to send a request for a web content by the web browser, sending a request to redeem the trust token with the secure multiparty computation system;
   in response to the request to redeem the trust token, receiving a signed record of redemption from the secure multiparty computation system based on a determination that a web site associated with the web content is not blocked; and
   sending a request, containing the signed record of redemption, for a third-party content, wherein the third-party content is associated with the web content.

2. The method of claim 1, wherein a signed record of redemption from the secure multiparty computation system is not received in response to the request to redeem the trust token based on a determination that a web site associated with the web content is blocked.

3. The method of claim 1, further comprising:
generating a second encrypted profile representing browser activity; and
sending the second encrypted profile to a secure multiparty computation system to request a second trust token,
wherein the second trust token from the secure multiparty computation system is not received in response to a determination that the web browser is engaged in online fraud, or the second trust token with a hidden bit indicating "fraudulent" is received if the web browser is determined to be engaged in online fraud.

4. The method of claim 1, wherein the encrypted signed record of redemption contains an indication of a determination of whether a browser, browsers aggregated over IP addresses, or user agent string is engaged in online fraud.

5. The method of claim 1, wherein when the encrypted signed record of redemption is a predetermined value indicating that a browser, browsers aggregated over IP addresses, or user agent string is determined not to be engaged in online fraud, the third-party content is displayed via the web browser.

6. The method of claim 1, wherein the trust token contains an encoded indicator representing that the web browser was determined to be engaged in online fraud.

7. The method of claim 1, wherein the encrypted profile represents browser activity at web pages, domains, or multiple domains owned by a same publisher.

8. The method of claim 1, wherein the web browser activity includes page view, click, or conversion activity.

9. The method of claim 1, wherein sending the encrypted profile to a secure multiparty computation system results in aggregation of the encrypted profile representing browser history based on IP address or browser user agent string.

10. The method of claim 1, wherein sending the encrypted profile to a secure multiparty computation system results in generation of a block list.

11. The method of claim 10, wherein the block list identifies a web page, domain, or multiple domains owned by a same publisher determined to be associated with online fraud.

12. The method of claim 10, wherein the block list identifies a browser, browsers aggregated over IP addresses or a user agent string determined to be associated with online fraud.

13. The method of claim 1, wherein the encrypted profile comprises a feature vector indicative of web pages or domains, or indicative of a number of times a user visited or otherwise interacted with web pages or domains.

14. A non-transitory computer storage medium encoded with instructions that when executed by a distributed computing system cause the distributed computing system to perform operations comprising:
generating an encrypted profile representing web browser activity;
sending the encrypted profile to a secure multiparty computation system, wherein:
  a first share of the encrypted profile is sent to a first server of the secure multiparty computation system;
  a second share of the encrypted profile is sent to a second server of the secure multiparty computation system; and
  both of the first share and the second share are required to reconstruct the encrypted profile;
receiving a trust token from the secure multiparty computation system, the trust token being indicative of whether the web browser is engaged in online fraud;
in preparation to send a request for a web content by the web browser, sending a request to redeem the trust token with the secure multiparty computation system;
in response to the request to redeem the trust token, receiving a signed record of redemption from the secure multiparty computation system based on a determination that a web site associated with the web content is not blocked; and
sending a request, containing the encrypted signed record of redemption, for a third-party content, wherein the third-party content is associated with the web content.

15. The non-transitory computer storage medium of claim 14, wherein the encrypted profile represents browser activity at web pages, domains, or multiple domains owned by a same publisher.

16. The non-transitory computer storage medium of claim 14, wherein a signed record of redemption from the secure multiparty computation system is not received in response to the request to redeem the trust token based on a determination that a web site associated with the web content is blocked.

17. The non-transitory computer storage medium of claim 14, the operations further comprising:
generating a second encrypted profile representing browser activity; and
sending the second encrypted profile to a secure multiparty computation system to request a second trust token,
wherein the second trust token from the secure multiparty computation system is not received in response to a determination that the web browser is engaged in online fraud, or the second trust token with a hidden bit indicating "fraudulent" is received if the web browser is determined to be engaged in online fraud.

18. The non-transitory computer storage medium of claim 14, wherein the signed record of redemption contains an indication of a determination of whether a browser, browsers aggregated over IP addresses, or user agent string is engaged in online fraud.

19. The non-transitory computer storage medium of claim 14, wherein when the signed record of redemption is a predetermined value indicating that a browser, browsers aggregated over IP addresses, or user agent string is determined not to be engaged in online fraud, the third-party content is displayed via the web browser.

20. The non-transitory computer storage medium of claim 14, wherein sending the encrypted profile to a secure multiparty computation system results in generation of a block list.

* * * * *